(12) United States Patent
Hieda

(10) Patent No.: US 9,758,041 B2
(45) Date of Patent: Sep. 12, 2017

(54) DRIVING FORCE CONTROL SYSTEM AND SADDLED VEHICLE

(71) Applicant: YAMAHA HATSUDOKI KABUSHIKI KAISHA, Iwata-shi (JP)

(72) Inventor: Kazuya Hieda, Iwata (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 261 days.

(21) Appl. No.: 14/566,705

(22) Filed: Dec. 10, 2014

(65) Prior Publication Data

US 2016/0061132 A1 Mar. 3, 2016

(30) Foreign Application Priority Data

Sep. 3, 2014 (JP) ................................ 2014-179161

(51) Int. Cl.
*F02D 41/04* (2006.01)
*B60K 31/00* (2006.01)
(Continued)

(52) U.S. Cl.
CPC ... *B60K 31/0083* (2013.01); *B60W 30/18145* (2013.01); *B60W 30/18172* (2013.01);
(Continued)

(58) Field of Classification Search
CPC . B60K 31/0083; F02D 41/045; F02D 11/105; F02D 41/021; F02D 41/10; F02D 11/106; B60W 30/18145; B60W 30/18172; B60W 2300/36; B60W 2510/0657; B60W 2520/18; B60W 2520/26; B60W 2520/28; B60W 2520/30; B60W 2540/10; B60W 2710/0605
(Continued)

(56) References Cited

U.S. PATENT DOCUMENTS 4,976,330 A * 12/1990 Matsumoto ............ B60K 28/14
180/197
6,151,546 A * 11/2000 Schmitt .................. B60K 28/16
180/197
(Continued)

FOREIGN PATENT DOCUMENTS

DE 10242124 A1 3/2004
DE 10-2005-003981 A1 8/2006
(Continued)

OTHER PUBLICATIONS

Japanese Office Action dated Jul. 14, 2015.
Extended European Search Report dated Jul. 28, 2015.

*Primary Examiner* — Thomas Moulis
*Assistant Examiner* — John Bailey
(74) *Attorney, Agent, or Firm* — Rabin & Berdo, P.C.

(57) ABSTRACT

A driving force control system according to an embodiment of the present invention includes: an absolute bank angle detector configured to detect an absolute bank angle that is the absolute value of a vehicle's bank angle; a calculation circuit configured to calculate a relative bank angle that is the vehicle's relative angle with respect to a maximum absolute bank angle that is the maximum value of the absolute bank angle; and a controller configured to control driving force based on the relative bank angle.

20 Claims, 11 Drawing Sheets

(51) Int. Cl.
  *B60W 30/18*  (2012.01)
  *F02D 41/02*  (2006.01)
  *F02D 41/10*  (2006.01)
  *F02D 11/10*  (2006.01)
  *F02D 41/00*  (2006.01)

(52) U.S. Cl.
  CPC .......... *F02D 11/105* (2013.01); *F02D 41/021* (2013.01); *F02D 41/10* (2013.01); *B60W 2300/36* (2013.01); *B60W 2510/0657* (2013.01); *B60W 2520/18* (2013.01); *B60W 2520/26* (2013.01); *B60W 2520/28* (2013.01); *B60W 2520/30* (2013.01); *B60W 2540/10* (2013.01); *B60W 2710/0605* (2013.01); *F02D 11/106* (2013.01); *F02D 41/0002* (2013.01); *F02D 2011/102* (2013.01); *F02D 2200/50* (2013.01); *F02D 2200/501* (2013.01); *F02D 2200/602* (2013.01); *F02D 2250/18* (2013.01)

(58) Field of Classification Search
  USPC ........ 701/110; 180/54.1; 123/349, 361, 396, 123/436, 370, 675, 682, 492; 322/11
  See application file for complete search history.

(56) References Cited

U.S. PATENT DOCUMENTS

| | | | |
|---|---|---|---|
| 6,311,111 B1 * | 10/2001 | Leimbach | B60T 8/17554 180/282 |
| 6,494,281 B1 * | 12/2002 | Faye | B60K 31/00 180/197 |
| 7,412,319 B2 * | 8/2008 | Fujioka | B62D 6/04 180/197 |
| 7,987,031 B2 * | 7/2011 | Diebold | B60R 21/0132 280/735 |
| 8,483,911 B2 * | 7/2013 | Reich | B60T 8/1708 180/197 |
| 8,712,659 B2 * | 4/2014 | Kieren | B60T 8/17554 701/36 |
| 9,346,510 B2 * | 5/2016 | Watanabe | B60T 8/1706 |
| 9,381,914 B2 * | 7/2016 | Klews | B60W 10/18 |
| 9,403,415 B2 * | 8/2016 | Lu | B60G 17/0165 |
| 9,409,573 B2 * | 8/2016 | Seki | B60W 30/02 |
| 9,435,269 B2 * | 9/2016 | Fujito | F02D 41/023 |
| 2004/0098185 A1 * | 5/2004 | Wang | B60T 8/1706 701/70 |
| 2005/0015191 A1 * | 1/2005 | Banno | B60T 8/175 701/70 |
| 2007/0021896 A1 * | 1/2007 | O'Dea | B60T 8/172 701/70 |
| 2007/0112498 A1 * | 5/2007 | Yasutake | B60T 8/17554 701/72 |
| 2008/0029987 A1 * | 2/2008 | Sugiyama | B60K 17/356 280/124.106 |
| 2009/0012676 A1 * | 1/2009 | Kawamura | F02D 17/04 701/38 |
| 2009/0103319 A1 | 4/2009 | Peeters et al. | |
| 2009/0326769 A1 * | 12/2009 | Oshima | B60K 28/16 701/51 |
| 2010/0017077 A1 * | 1/2010 | Oshima | B60K 28/16 701/51 |
| 2010/0114420 A1 * | 5/2010 | Doi | B60N 2/0244 701/31.4 |
| 2010/0191408 A1 * | 7/2010 | Boylston | G01C 9/00 701/31.4 |
| 2010/0312449 A1 | 12/2010 | Savaresi et al. | |
| 2012/0083973 A1 * | 4/2012 | Araki | B62K 21/00 701/43 |
| 2012/0239264 A1 * | 9/2012 | Kojima | F16H 61/16 701/53 |
| 2013/0090828 A1 * | 4/2013 | Lemejda | B60W 10/06 701/83 |
| 2014/0019006 A1 * | 1/2014 | Bruce | B62D 5/0457 701/41 |
| 2014/0200780 A1 * | 7/2014 | Watanabe | B60T 8/1706 701/68 |
| 2014/0236425 A1 * | 8/2014 | Savaresi | B62K 25/04 701/38 |
| 2015/0057904 A1 * | 2/2015 | Nishimura | B60T 8/1706 701/70 |
| 2015/0112569 A1 * | 4/2015 | Yamane | B60W 30/04 701/72 |
| 2015/0158360 A1 * | 6/2015 | Uebayashi | B60G 3/26 280/5.508 |
| 2015/0183480 A1 * | 7/2015 | Ono | B62J 27/00 701/72 |
| 2015/0274019 A1 * | 10/2015 | Matsuda | B62K 11/04 701/22 |
| 2015/0274160 A1 * | 10/2015 | Lee | B62D 6/002 701/41 |
| 2015/0314781 A1 * | 11/2015 | Klews | B60W 10/18 701/71 |
| 2016/0059850 A1 * | 3/2016 | Hieda | B60T 8/1706 701/1 |
| 2017/0008500 A1 * | 1/2017 | Iwatsuki | B60T 8/241 |

FOREIGN PATENT DOCUMENTS

| | | |
|---|---|---|
| EP | 1714862 A2 | 10/2006 |
| EP | 2738075 A1 | 6/2014 |
| EP | 2993333 A1 | 3/2016 |
| JP | 2000-025599 A | 1/2000 |
| JP | 2001-047996 A | 2/2001 |
| JP | 2004-051091 A | 2/2004 |
| JP | 2004-051091 A | 2/2004 |
| JP | 2005-047314 A | 2/2005 |
| JP | 2005-061376 A | 3/2005 |
| JP | 2005-152834 A | 6/2005 |
| JP | 2008-231990 A | 10/2008 |
| JP | 2009-530177 A | 8/2009 |
| JP | 2010-285987 A | 12/2010 |
| JP | 2011-099382 A | 5/2011 |
| JP | 2011-185107 A | 9/2011 |
| JP | 2011-185107 A | 9/2011 |
| JP | 2013-523532 A | 6/2013 |
| JP | 2013-209047 A | 10/2013 |
| JP | WO 2014017138 A1 * | 1/2014 .............. B62J 27/00 |
| JP | 2016-053324 A | 4/2016 |
| WO | WO 2014-017138 A1 | 1/2014 |

* cited by examiner

FIG. 11
(a)
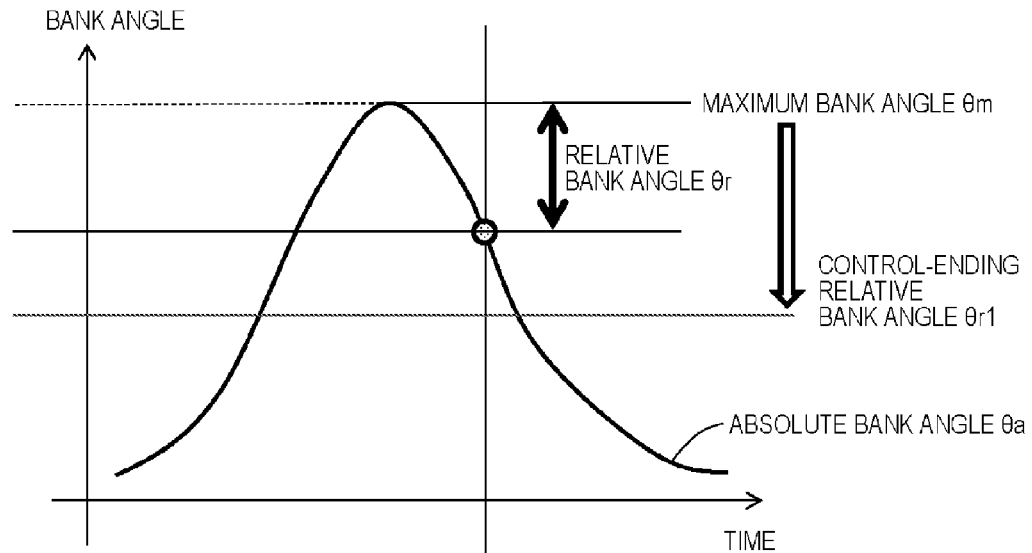
(b)
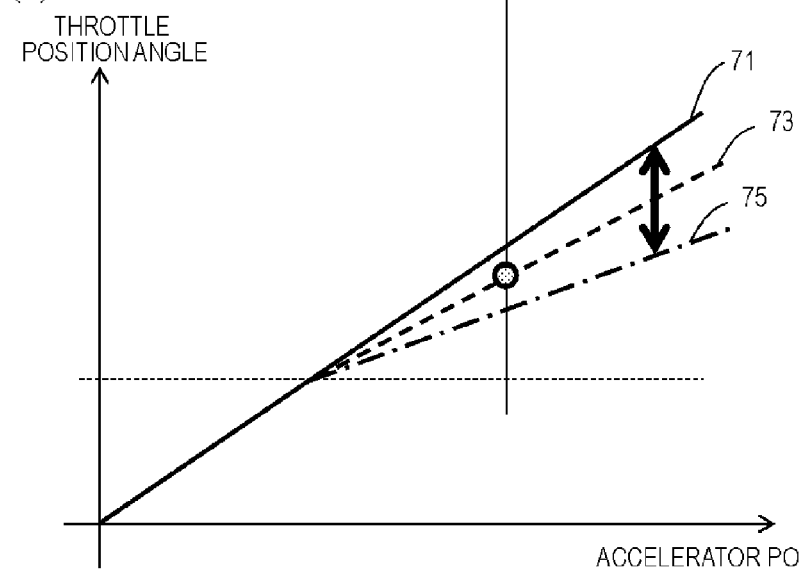

DRIVING FORCE CONTROL SYSTEM AND SADDLED VEHICLE

CROSS-REFERENCE TO RELATED APPLICATION

This application is based on Japanese Patent Application No. 2014-179161 filed on Sep. 3, 2014, the entire contents of which are hereby incorporated by reference.

BACKGROUND

1. Technical Field

The present invention relates to a driving force control system for a vehicle which banks while rounding a curve, and also relates to a saddled vehicle including such a control system.

2. Description of the Related Art

People have attempted to improve a motorcycle's running performance by controlling its driving force. When driving a motorcycle around a curve, the rider is required to twist the accelerator grip finely. For example, if the engine power increases steeply as the rider turns the accelerator suddenly, then the rear wheel will slide and other phenomena will arise. For that reason, while the motorcycle is rounding a curve, a variation in its engine power with the rider's turning the accelerator is suitably controlled with those phenomena taken into consideration.

Japanese Laid-Open Patent Publication No. 2011-185107 (which will be hereinafter referred to as "Patent Document No. 1" for convenience sake) discloses that a variation in the degree of opening of an electronically controlled throttle valve in response to the rider's accelerator turning should have a different pattern according to the motorcycle's bank angle. Patent Document No. 1 also says that if the rider is going to make a "drift run" while sliding the rear wheel intentionally, the degree of opening of the valve is increased and the engine power is increased steeply as the rider twists the accelerator grip, thereby allowing him or her to make the "drift run" easily.

SUMMARY

When driving a motorcycle around a curve, the rider is required to twist the accelerator grip finely. Particularly when the bank angle is large, if the engine power increased steeply in response to the rider's accelerator turning, then the driving force on the rear wheel would increase so steeply as to cause sliding and other phenomena easily. Thus, in such a situation, the rider should twist the accelerator grip even more finely. For that reason, when the bank angle is large, the engine power may be reduced with respect to the same accelerator position angle. For example, the accelerator-throttle characteristic, representing how the throttle position angle changes with the accelerator position angle, may be changed according to bank angle. Specifically, when the bank angle is large, an accelerator-throttle characteristic that the throttle position angle increases gently with respect to the accelerator position angle may be adopted to reduce the engine power. In addition, since the throttle position angle changes just gently for the magnitude of the accelerator grip turned, the rider can twist the accelerator grip even more finely.

The bank angle can be detected by an acceleration sensor, a gyroscope or any other sensor built in a motorcycle. If the vehicle is standing upright (e.g., while a motorcycle is running straight forward), the bank angle becomes almost 0 degrees. On the other hand, while the vehicle is rounding a curve, the vehicle banks to have a predetermined bank angle which is greater than zero degrees. The bank angle may be defined to be an angle formed between the vertically upward direction and the height direction of the motorcycle, for example. That is to say, the bank angle is measured with respect to the vertical direction.

The present inventors studied deeply a technique for controlling the engine's driving force according to bank angle. When the engine's driving force is controlled according to the bank angle that is defined with respect to the vertical direction, sometimes the control needs to be carried out with the running condition taken into consideration in more detail. For example, a curve of a road on which a motorcycle runs may have a so-called "cant" which is a sloped outer peripheral portion that is higher in level than its inner peripheral portion. In running on a road with such a cant, the engine control according to bank angle is suitably carried out with the actual state of contact of the tires with the road surface (in terms of the grip force, for example) taken into account. While a vehicle is running on a road with a cant, the angle formed between the vehicle's height direction and the surface of the road becomes close to a right angle, and the rear wheel's grip force becomes high, when the vehicle is tilted to a certain degree with respect to the vertical direction. That is why even if the vehicle is further banked in such a state, the required grip force can still be ensured. In such a situation, however, the bank angle with respect to the vertical direction becomes so large that the engine power will be reduced too much (or more than necessarily) to accelerate the vehicle as intended.

Also, when running on a road with a wet surface, a vehicle rounding a curve tends to have a smaller bank angle than when running on a road with a dry surface. Since the rear wheel's grip force has decreased in this case since the road surface is wet, the bank angle with respect to the vertical direction remains small. That is why the engine power will be reduced to a lesser degree, and therefore, the rear wheel may slide in some cases due to a steep increase in engine power.

On the other hand, when running around a circuit, the vehicle will round the same curve over and over again. However, if the vehicle follows a different track while rounding the same curve, then the bank angle will also be different. That is why the engine control will work differently in such a situation, and the rider will find the vehicle' behavior unnatural.

Furthermore, although the bank angle can be detected with an acceleration sensor and a gyroscope, for example, the detection values of the acceleration sensor and gyroscope may include some noise due to disturbance, for example.

As can be seen from the foregoing description, if the engine's driving force is controlled based on the bank angle with respect to the vertical direction, the running condition and disturbance are not fully taken into account, and there is still room for improvement there.

The present inventors perfected our invention in order to overcome these problems by providing a driving force control system which can improve the running performance with the driving force controlled more precisely and accurately while the vehicle is rounding a curve and a saddled vehicle including such a control system.

A driving force control system according to an embodiment of the present invention includes: an absolute bank angle detector configured to detect an absolute bank angle that is the absolute value of a vehicle's bank angle; a calculation circuit configured to calculate a relative bank angle that is the vehicle's relative angle with respect to a maximum absolute bank angle that is the maximum value of the absolute bank angle; and a controller configured to control driving force based on the relative bank angle.

In one embodiment, the controller may change an accelerator-throttle characteristic, representing how a throttle position angle changes with an accelerator position angle, according to the relative bank angle.

In another embodiment, if the relative bank angle is small, the controller may control the driving force based on an accelerator-throttle characteristic in which the throttle position angle changes at a smaller ratio with respect to the accelerator position angle than when the relative bank angle is large.

In still another embodiment, as the relative bank angle increases, the controller may turn the accelerator-throttle characteristic into a characteristic in which the throttle position angle changes at a larger ratio with respect to the accelerator position angle.

In yet another embodiment, the absolute bank angle detector may start detecting the maximum absolute bank angle after the vehicle's front wheel speed has slowed down.

In yet another embodiment, the absolute bank angle detector may start detecting the maximum absolute bank angle if the accelerator position angle is equal to or smaller than a predetermined value.

In yet another embodiment, the absolute bank angle detector may start detecting the maximum absolute bank angle if the absolute bank angle is equal to or smaller than a predetermined value.

In yet another embodiment, on sensing that the absolute bank angle has become equal to or greater than a predetermined value, the controller may start controlling the driving force to change the accelerator-throttle characteristic.

In yet another embodiment, on sensing that the accelerator position angle has become equal to or greater than a predetermined value, the controller may start controlling the driving force to change the accelerator-throttle characteristic.

In yet another embodiment, on sensing that the torque of the vehicle's driving source has become equal to or greater than a predetermined value, the controller may start controlling the driving force to change the accelerator-throttle characteristic.

In yet another embodiment, the controller may change a slip value to be a threshold value, at which a traction control is turned ON and OFF, according to the relative bank angle.

In yet another embodiment, if the relative bank angle is small, the controller may decrease the threshold slip value, compared to when the relative bank angle is large.

In yet another embodiment, the controller may reduce the driving force through the traction control to a varying degree according to the relative bank angle.

In yet another embodiment, if the relative bank angle is small, the controller may reduce the driving force more significantly than when the relative bank angle is large.

A saddled vehicle according to an embodiment of the present invention includes a driving force control system according to any of the embodiments described above.

A computer program according to an embodiment of the present invention is defined to make a computer control a saddled vehicle's driving force. The computer program is defined to make the computer perform the steps of: detecting an absolute bank angle which is the absolute value of the saddled vehicle's bank angle; calculating a relative bank angle that is the saddled vehicle's relative angle with respect to a maximum absolute bank angle that is the maximum value of the absolute bank angle; and controlling the driving force based on the relative bank angle.

A driving force control system according to an embodiment of the present invention calculates a relative bank angle that is the vehicle's relative angle with respect to a maximum absolute bank angle, and controls driving force based on the relative bank angle. As a result, a vehicle's running performance can be improved by controlling the driving force more precisely and accurately while the vehicle is rounding a curve.

In an exemplary embodiment, an accelerator-throttle characteristic, representing how a throttle position angle changes with an accelerator position angle, is adjusted according to the relative bank angle. According to such an embodiment, the engine power can be controlled according to the relative bank angle.

In another exemplary embodiment, if the relative bank angle is small, the driving force is controlled based on an accelerator-throttle characteristic in which the throttle position angle changes at a smaller ratio with respect to the accelerator position angle than when the relative bank angle is large. By reducing the engine power with respect to the same accelerator position angle if the relative bank angle is small, it is possible to prevent the vehicle's rear wheel from sliding due to a steep rise in driving force. In addition, since the throttle position angle changes just gently and slowly in response to the rider's accelerator turning, he or she can easily twist the accelerator grip as finely as required while rounding a curve.

In still another exemplary embodiment, as the relative bank angle increases, the accelerator-throttle characteristic is changed into a characteristic in which the throttle position angle changes at a larger ratio with respect to the accelerator position angle. As the rider is raising the vehicle to the upright position, the magnitude of permissible slip of the rear wheel increases. That is why by gradually turning the accelerator-throttle characteristic into a characteristic when the vehicle goes straight, the rider can accelerate the vehicle smoothly after having rounded a corner.

In yet another exemplary embodiment, the maximum absolute bank angle may start to be detected after the vehicle's front wheel speed has slowed down. According to such an embodiment, the maximum absolute bank angle can start to be detected at a point in time when a vehicle which has been running straight starts rounding a curve. In addition, it is also possible to prevent the operation of detecting the maximum absolute bank angle from being performed when the vehicle is not rounding a curve.

In yet another exemplary embodiment, if the accelerator position angle is equal to or smaller than a predetermined value, the maximum absolute bank angle starts to be detected. According to such an embodiment, the maximum absolute bank angle can start to be detected at a point in time when a vehicle which has been running straight starts rounding a curve. In addition, it is also possible to prevent the operation of detecting the maximum absolute bank angle from being performed when the vehicle is not rounding a curve.

In yet another exemplary embodiment, if the absolute bank angle is equal to or smaller than a predetermined value, the maximum absolute bank angle may start to be detected. According to such an embodiment, the maximum absolute bank angle can start to be detected at a point in time when a vehicle which has been running straight starts rounding a curve.

In yet another exemplary embodiment, on sensing that the absolute bank angle has become equal to or greater than a predetermined value, the driving force starts to be controlled to change the accelerator-throttle characteristic. According to such an embodiment, the driving force reduction control is not carried out when the vehicle is running in almost an upright position, but can be carried out only when the vehicle is rounding at so large an absolute bank angle that the driving force needs to be reduced.

In yet another exemplary embodiment, on sensing that the accelerator position angle has become equal to or greater than a predetermined value, the driving force starts to be controlled to change the accelerator-throttle characteristic. According to such an embodiment, the driving force reduction control can be carried out on and after a time when the vehicle's driving force reaches a level at which the vehicle starts to be accelerated.

In yet another exemplary embodiment, on sensing that the torque of the vehicle's driving source has become equal to or greater than a predetermined value, the driving force starts to be controlled to change the accelerator-throttle characteristic. According to such an embodiment, the driving force reduction control can be carried out on and after a time when the vehicle's driving force reaches a level at which the vehicle starts to be accelerated.

In yet another exemplary embodiment, a slip value to be a threshold value, at which a traction control is turned ON and OFF, is changed according to the relative bank angle. By performing a traction control based on the relative bank angle, the vehicle's running performance can be further improved by controlling the driving force more precisely and accurately while the vehicle is rounding a curve.

In yet another exemplary embodiment, if the relative bank angle is small, the threshold slip value may be decreased compared to when the relative bank angle is large. If the relative bank angle is small, the magnitude of permissible slipping is small. That is why by setting the threshold slip value to be low, the traction control can interfere more easily.

In yet another exemplary embodiment, the driving force may be reduced through the traction control to a varying degree according to the relative bank angle. According to such an embodiment, the vehicle's running performance can be further improved by controlling the driving force more precisely and accurately while the vehicle is rounding a curve.

In yet another exemplary embodiment, if the relative bank angle is small, the driving force may be reduced more significantly than when the relative bank angle is large. If the relative bank angle is small, the magnitude of permissible slipping is also small. That is why by reducing the driving force more significantly, the vehicle's behavior can be stabilized.

According to the present invention, the driving force is controlled based on a relative bank angle that is a vehicle's relative bank angle with respect to a maximum absolute bank angle. Consequently, the vehicle's running performance can be improved by controlling the driving force more precisely and accurately while the vehicle is rounding a curve.

Other features, elements, processes, steps, characteristics and advantages of the present invention will become more apparent from the following detailed description of preferred embodiments of the present invention with reference to the attached drawings.

Figure 3:
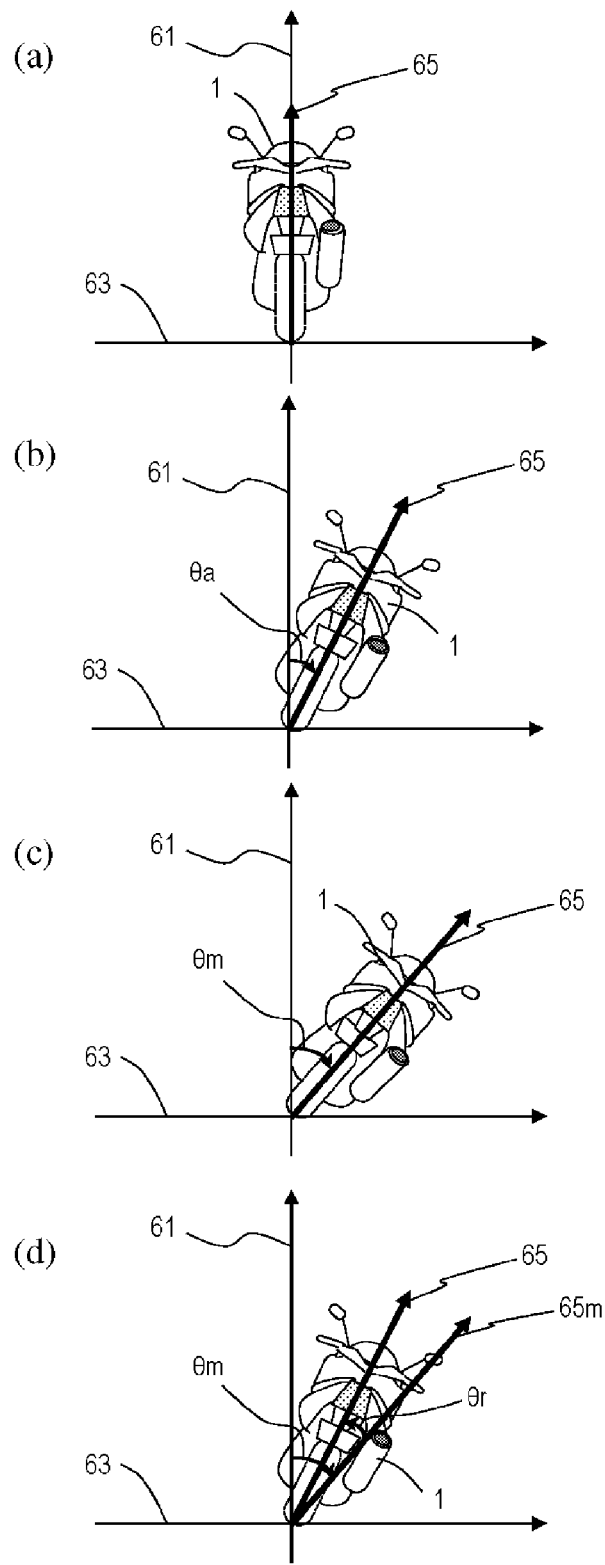

Portions (a) through (d) of FIG. 3 illustrate what the absolute bank angle, maximum absolute bank angle and relative bank angle mean according to an embodiment of the present invention.

Figure 4:
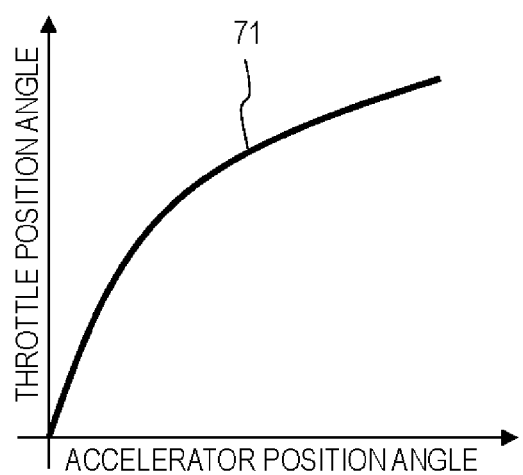

FIG. 4 shows how the accelerator-throttle characteristic varies when the motorcycle is going straight forward in an embodiment of the present invention.

Figure 5:
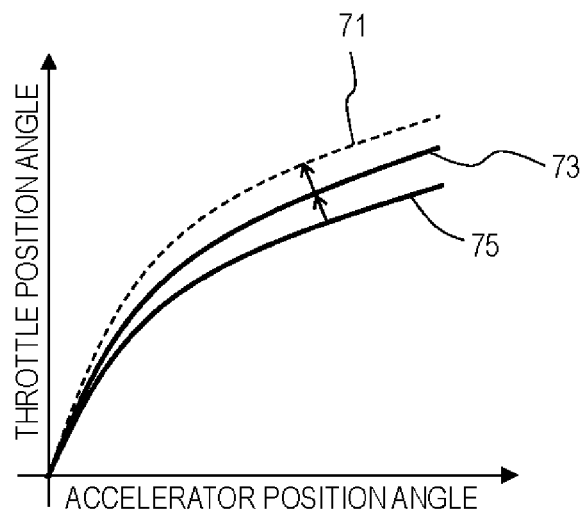

FIG. 5 shows how the accelerator-throttle characteristic changes with the relative bank angle in an embodiment of the present invention.

Figure 6:
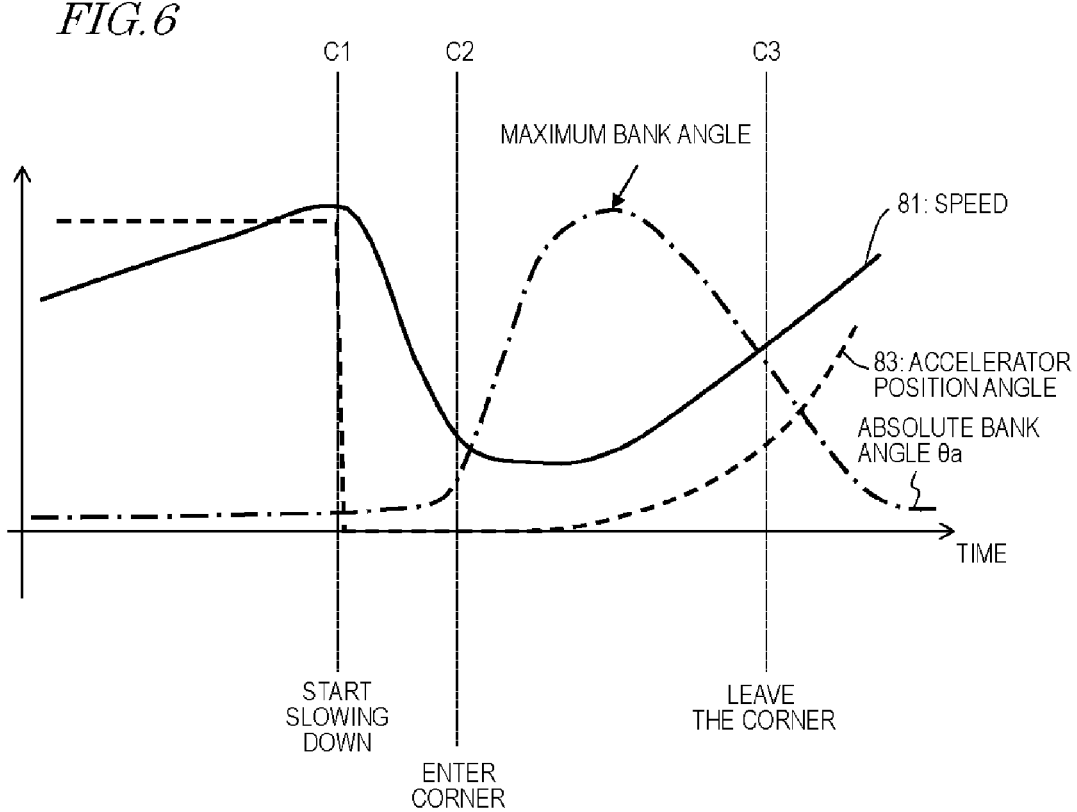

FIG. 6 shows how respective parameters change as the running state of the motorcycle changes in an embodiment of the present invention.

Figure 7:
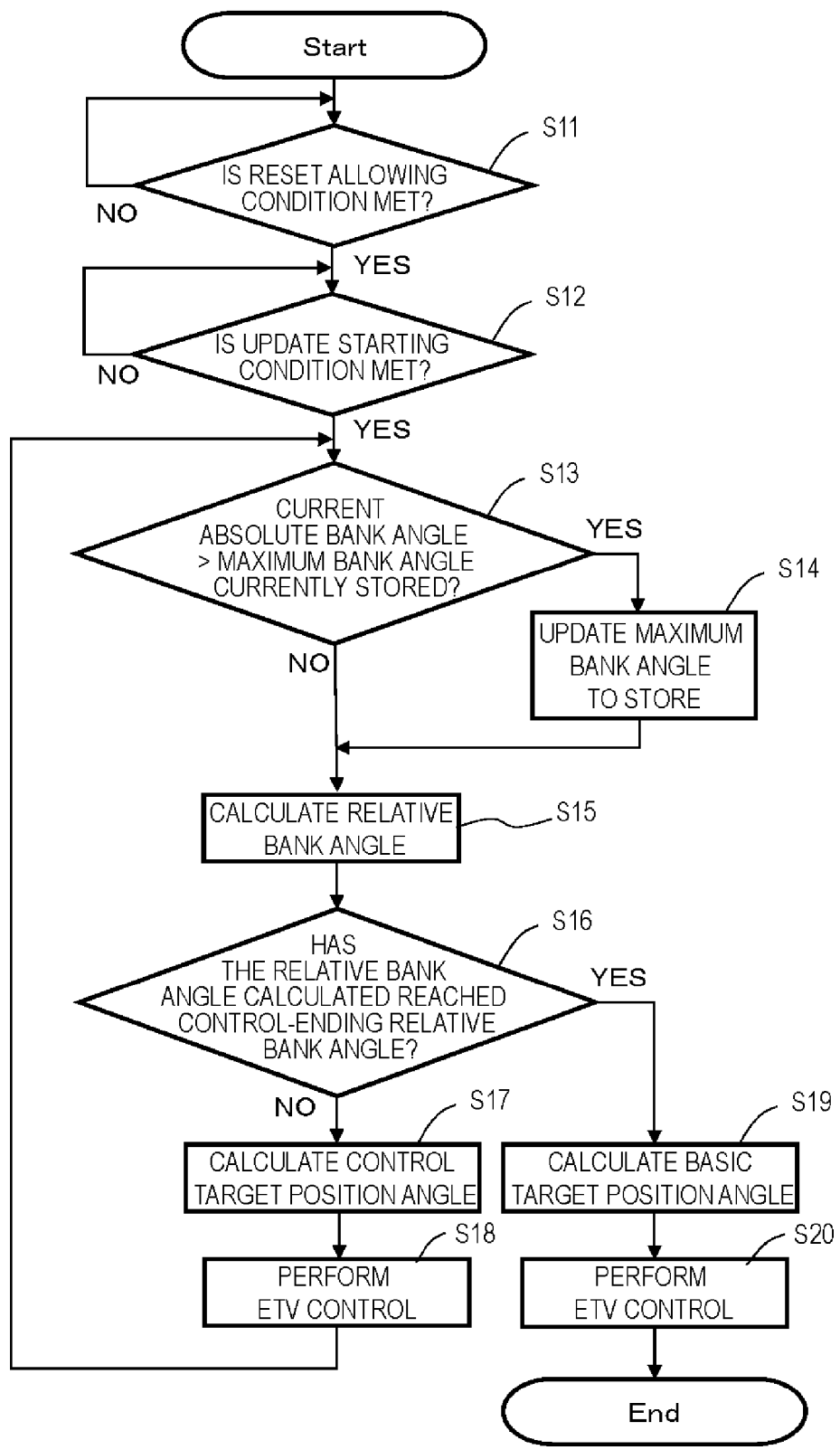

FIG. 7 is a flowchart showing the procedure of processing to be carried out by the ECU according to an embodiment of the present invention.

Figure 8:
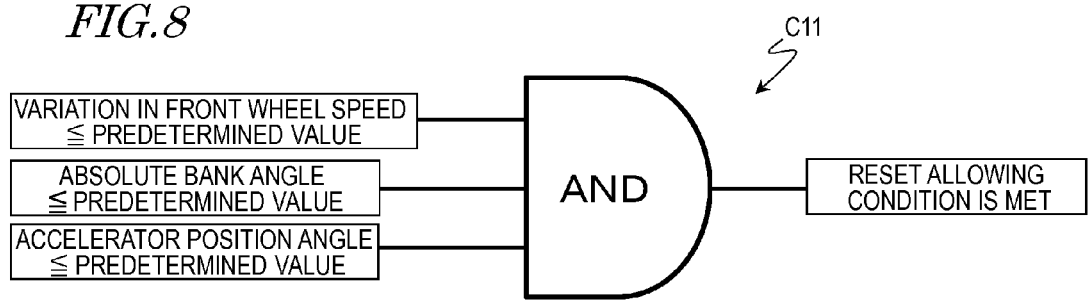

FIG. 8 shows a condition on which the maximum absolute bank angle θm may be reset in an embodiment of the present invention.

Figure 9:
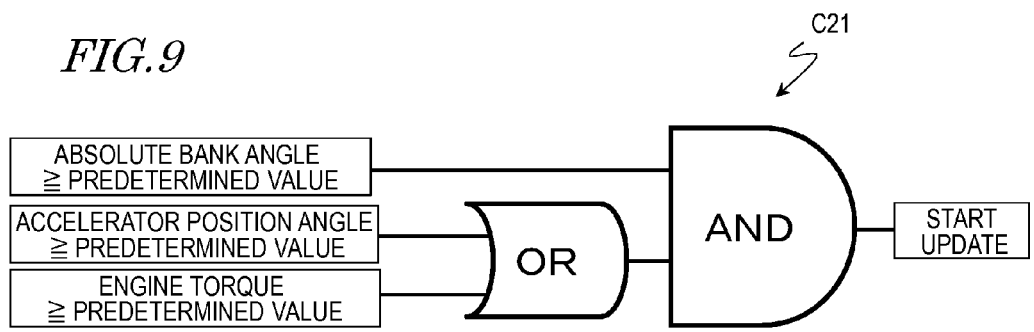

FIG. 9 shows a condition on which the maximum absolute bank angle θm may start to be updated in an embodiment of the present invention.

Figure 10:
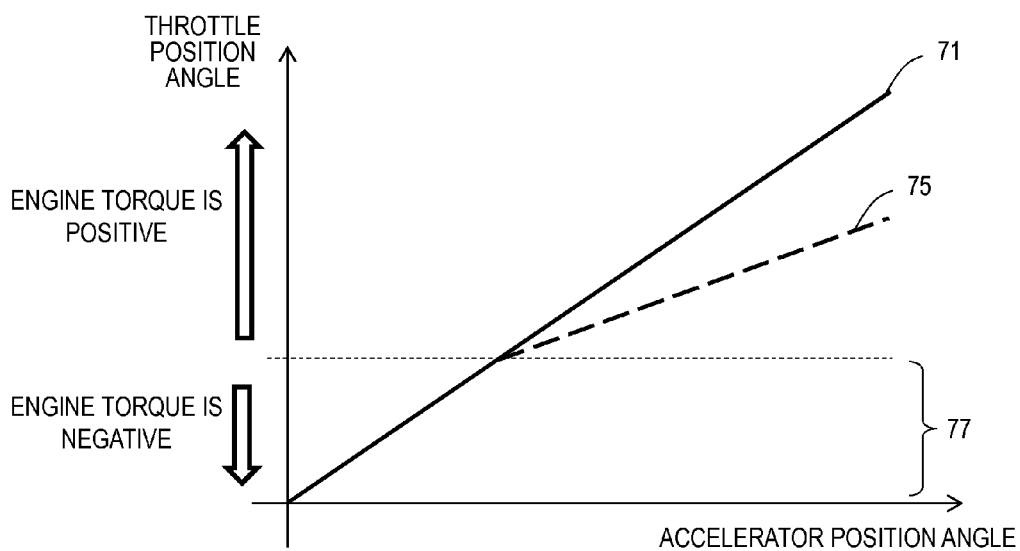

FIG. 10 shows how the accelerator-throttle characteristic changes with the engine torque in an embodiment of the present invention.

Portions (a) and (b) of FIG. 11 show how the accelerator-throttle characteristic changes with the bank angle in an embodiment of the present invention.

Figure 12:
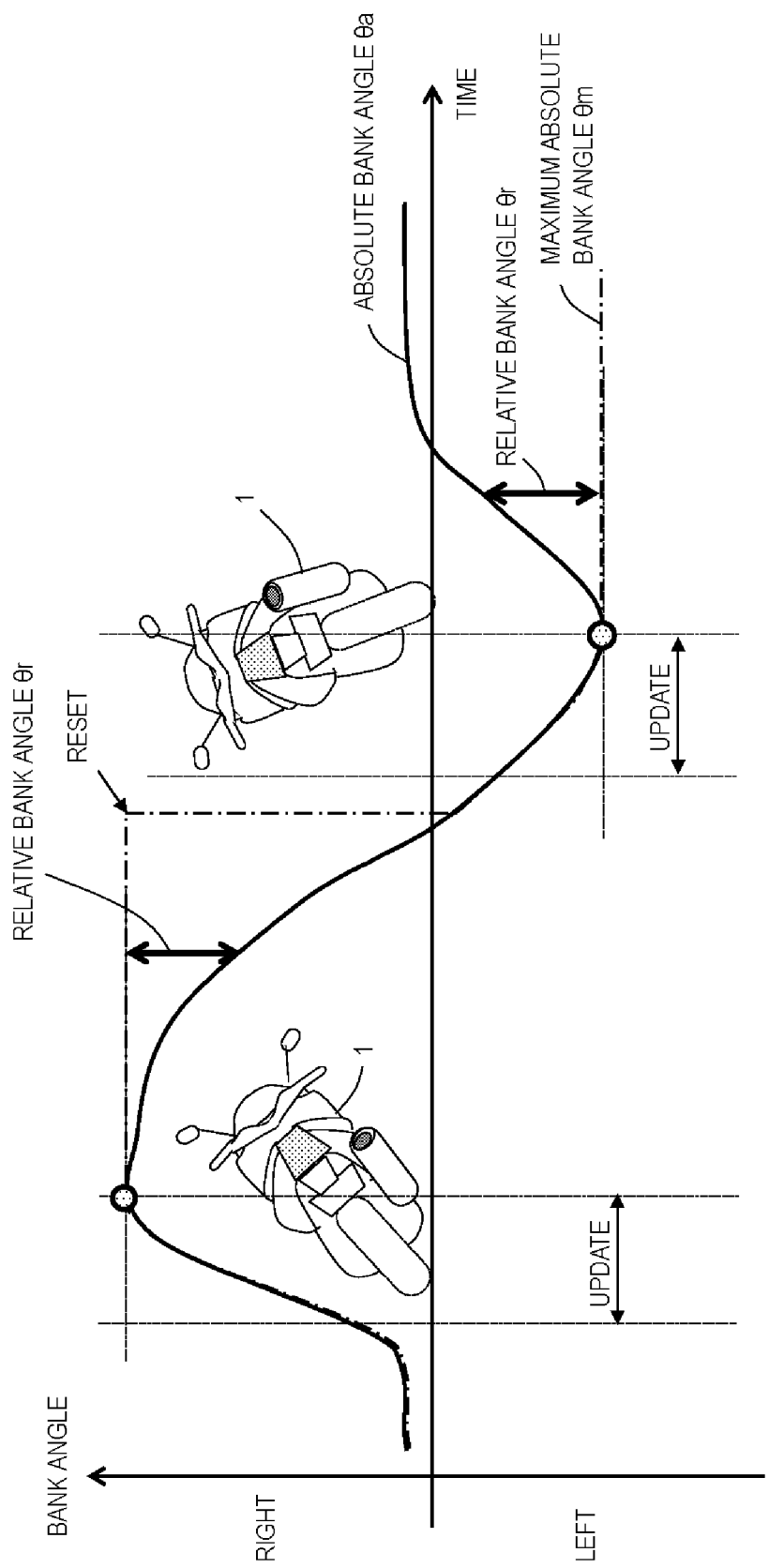

FIG. 12 shows how to perform resetting and updating processing when the motorcycle is rounding an S-curve in an embodiment of the present invention.

Figure 13:
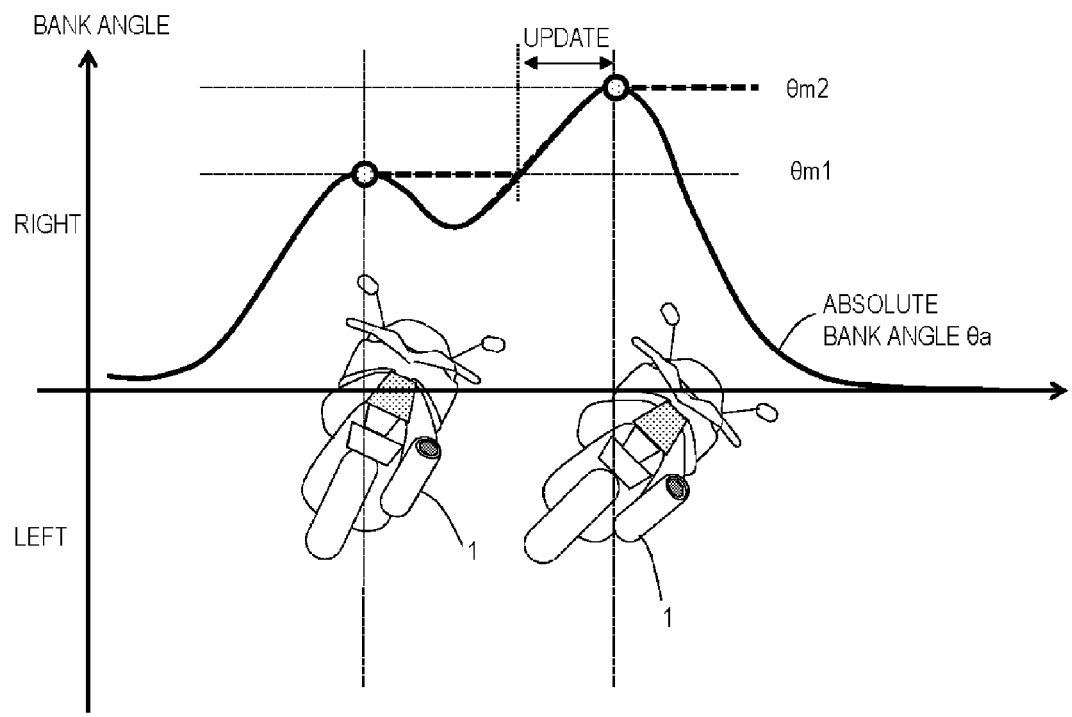

FIG. 13 shows how to perform resetting and updating processing when the motorcycle needs to go through a double apex corner in which there are a series of two corners with different radii of curvature in an embodiment of the present invention.

Figure 14:
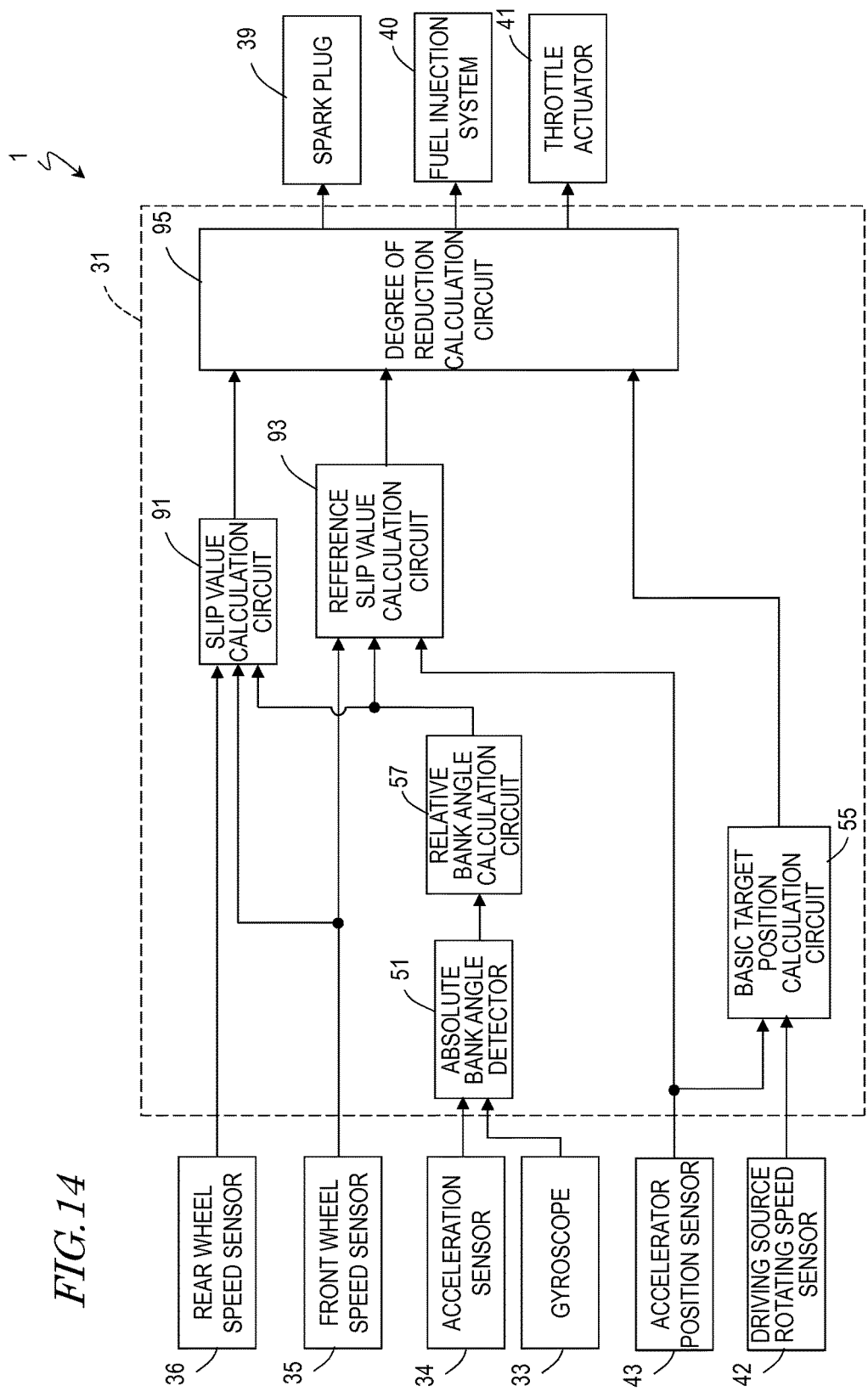

FIG. 14 is a functional block diagram of an ECU which carries out a traction control based on the relative bank angle θr according to an embodiment of the present invention.

DETAILED DESCRIPTION

A driving force control system according to an embodiment of the present invention and a saddled vehicle including such a control system will now be described with reference to the accompanying drawings. In the following description, the present invention is supposed to be applied to a motorcycle.

The motorcycle to be described below includes an engine as a driving source and drives a single rear wheel. The motorcycle further includes a brake as a braking system to decrease the rotational velocity of the rear wheel. On the other hand, a front wheel of the motorcycle is a driven wheel to which no driving force is transmitted. A saddled vehicle includes at least one driving wheel and at least one front wheel. The driving source does not have to be an engine but may also be a motor or any other rotary power transfer device that rotates and drives the rear wheel. Also, in the following description, the front, rear, right and left will be defined with respect to the direction in which the motorcycle is heading.

Figure 1:
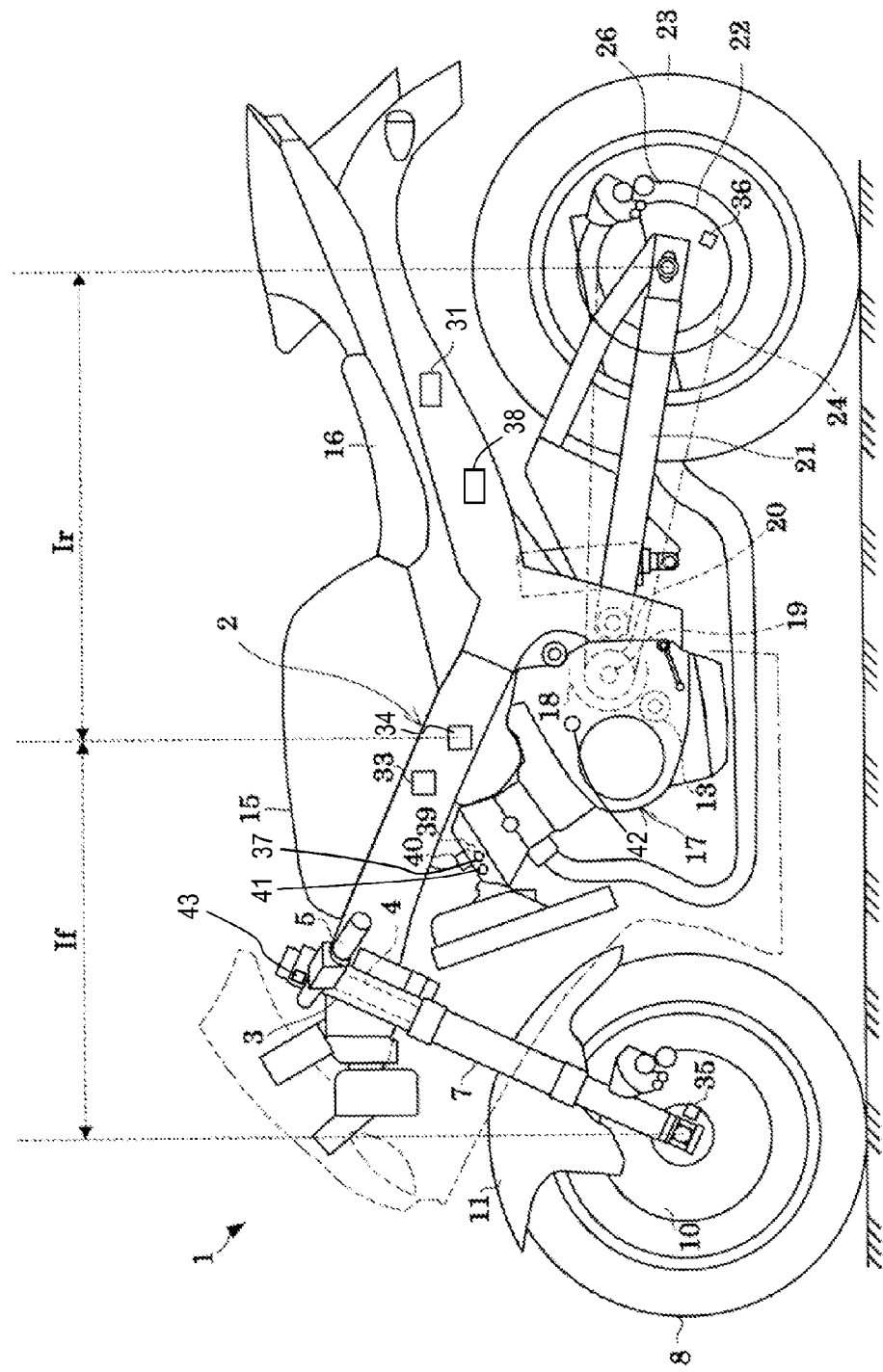
FIG. 1 is a side view illustrating a configuration for a motorcycle according to an embodiment of the present invention.

FIG. 1 is a side view illustrating a general configuration for a motorcycle 1 according to an embodiment of the present invention. This motorcycle 1 includes a main frame 2. A head pipe 3 is arranged to run through an upper part of the front end portion of the main frame 2. A steering shaft 4 is inserted into the head pipe 3. A pair of handlebars 5 is connected to the upper end portion of the steering shaft 4. On the right-hand side of one of the handlebars 5, arranged is a brake lever (not shown).

A pair of extendable and shrinkable front forks 7 are connected to the lower end portion of the steering shaft 4. Thus, by turning the handlebars 5, the front forks 7 swing. A front wheel 8 is attached rotatably to the lower end of the front forks 7. As the front forks 7 extend or shrink, the vibrations of the front wheel 8 are damped. A front wheel brake 10 is attached to the lower end of the front forks 7 so that the rider can brake the front wheel 8 rotating by turning the brake lever. In addition, a front wheel speed sensor 35 is also arranged near the lower end of the front forks 7 to detect and output the rotational velocity of the front wheel 8. A front fender 11 is secured to the front forks 7 over the front wheel 8.

On the main frame 2, a fuel tank 15 and a seat 16 are arranged in line along the main frame 2. Under the fuel tank 15, an engine 17 and a gearbox 18 are held by the main frame 2. The engine 17 is provided with a spark plug 39, a fuel injection system 40 and a throttle actuator 41. In addition, a throttle sensor 37 which detects and outputs the position of an electronic throttle valve (ETV) and a driving source rotating speed sensor 42 which detects and outputs the engine speed are also provided.

A clutch 13 is arranged between the engine 17 and the gearbox 18. The gearbox 18 has a drive shaft 19 which outputs the power that has been generated by the engine 17. A drive sprocket 20 is connected to the drive shaft 19. The power generated by the engine 17 is selectively output to the drive shaft 19 by engaging or disengaging the clutch 13. The gearbox 18 includes a plurality of gears, and changes the number of revolutions that have been transmitted from the engine 17 at one of multiple transmission gear ratios that has been selected, thereby rotating and driving the drive shaft 19.

A pair of swing arms 21 is supported under and behind the main frame 2 so as to swing toward any direction. At the rear end of the swing arms 21, a driven sprocket 22 and a rear wheel 23 are supported rotatably. A rear wheel speed sensor 36 which detects and outputs the rotational velocity of the rear wheel 23 is arranged near the driven sprocket 22. A rear wheel brake 26 which works by pumping a pedal brake (not shown) is provided for the rear wheel 23. A chain 24 is suspended between the drive sprocket 20 and the driven sprocket 22. The driving force generated by the engine 17 is transmitted to the rear wheel 23 via the clutch 13, gearbox 18, drive shaft 19, drive sprocket 20, chain 24 and driven sprocket 22.

Under the seat 16, arranged are a brake modulator 38 and an electronic control unit (ECU) 31 which controls the operations of respective parts of this motorcycle 1. The ECU 31 may be implemented as a combination of a microcomputer and a memory which stores a program defining the procedure of controlling the operations of respective parts of this motorcycle 1, for example.

The brake modulator 38 detects the braking pressures on the front and rear wheel brakes 10 and 26 (i.e., the magnitude of the braking force), and adjusts the braking pressures on the front and rear wheel brakes 10 and 26 in response to operations on the brake lever and the brake pedal.

This motorcycle 1 further includes a gyroscope 33 and an acceleration sensor 34 and detects the bank angle of this vehicle using the gyroscope 33 and the acceleration sensor 34. Optionally, the motorcycle 1 may include a hexaxial inertial measurement unit as the gyroscope 33 and acceleration sensor 34.

Figure 2:
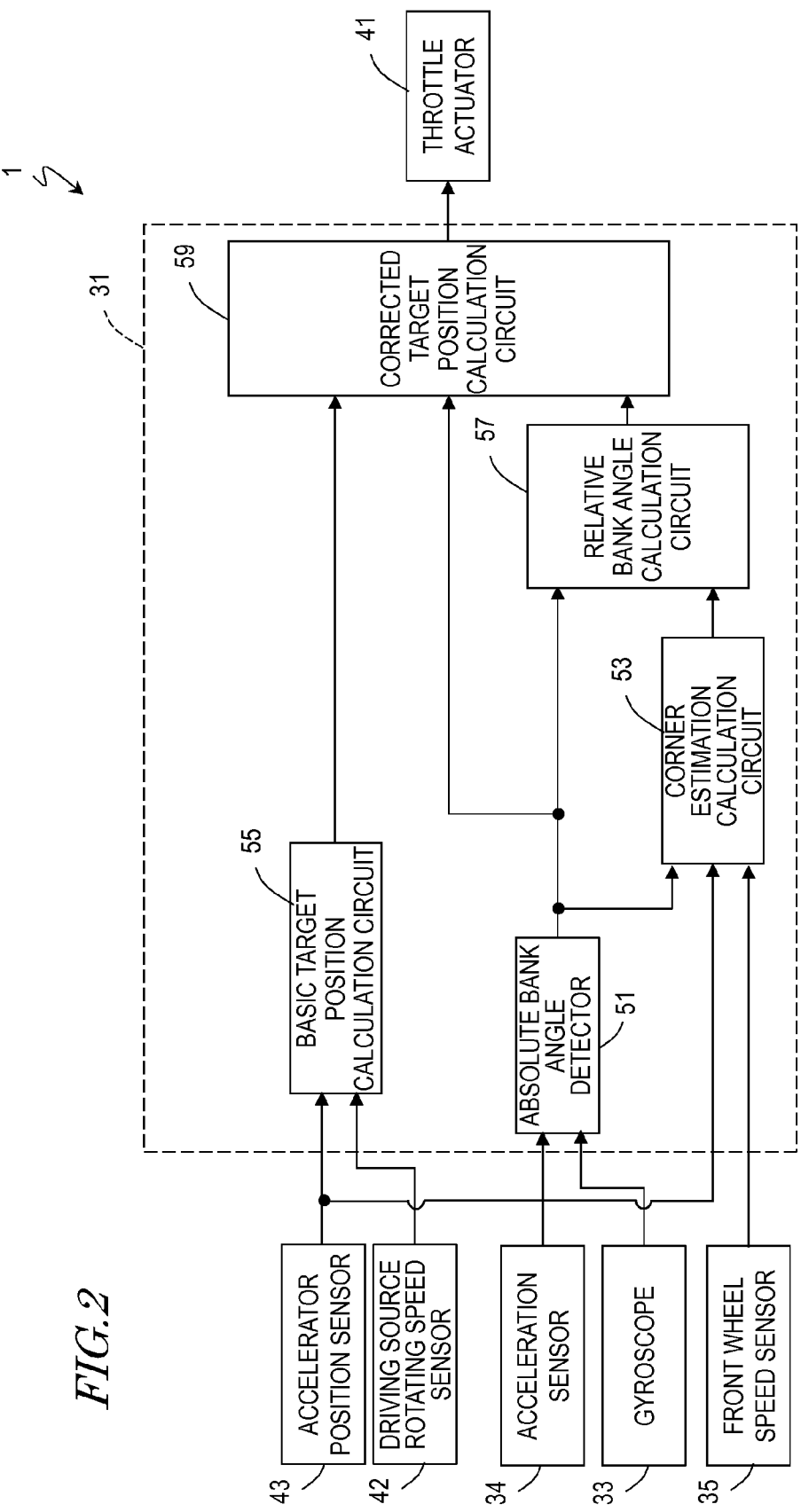
FIG. 2 is a functional block diagram of an ECU according to an embodiment of the present invention.

FIG. 2 is a functional block diagram of the ECU 31, which includes an absolute bank angle detector 51, a corner estimation calculation circuit 53, a basic target position calculation circuit 55, a relative bank angle calculation circuit 57, and a corrected target position calculation circuit 59. The functions of these components can be carried out by making a microcomputer retrieve and execute a program that is stored in a memory. Optionally, the ECU 31 may also have the function of controlling the respective parts of the motorcycle 1 in addition to these components. Alternatively, at least some of these components of the ECU 31 may be included in a different control unit from the ECU 31.

The ECU 31 controls the driving force based on a relative bank angle that is the motorcycle's (1) relative bank angle with respect to a maximum absolute bank angle. Next, it will be described exactly what the absolute bank angle, maximum absolute bank angle and relative bank angle mean in this description.

Portions ($a$) through ($d$) of FIG. 3 illustrate what the absolute bank angle, maximum absolute bank angle and relative bank angle mean using a motorcycle 1 as viewed from right behind it.

Portion ($a$) of FIG. 3 illustrates a situation where the motorcycle 1 is standing upright. In this state, the height direction 65 of the motorcycle 1 agrees with the vertically upward direction 61 and the angle formed between these two directions is zero degrees. The horizontal direction 63 intersects at right angles with the vertically upward direction 61. For example, a motorcycle 1 running straight forward is in the state shown in FIG. 3($a$).

Next, as shown in portion ($b$) of FIG. 3, if the motorcycle 1 banks while rounding a curve, the angle formed between the vertically upward direction 61 and the height direction 65 of the motorcycle 1 becomes a predetermined angle which is greater than zero degrees. Such an angle $\theta a$ defined by the motorcycle's (1) height direction 65 with respect to the vertically upward direction 61 will be hereinafter referred to as an "absolute bank angle". In the state shown in portion ($a$) of FIG. 3, the absolute bank angle $\theta a$ is zero degrees.

Next, as shown in portion ($c$) of FIG. 3, while the motorcycle 1 is rounding a curve, the absolute bank angle $\theta a$ gradually increases to reach the maximum angle soon. After that, the absolute bank angle $\theta a$ will decrease gradually. That maximum value $\theta m$ of the absolute bank angle $\theta a$ which changes while the motorcycle 1 is rounding a curve will be hereinafter referred to as the "maximum absolute bank angle".

Next, as shown in portion ($d$) of FIG. 3, after the absolute bank angle of the motorcycle 1 has reached the maximum absolute bank angle $\theta m$, the motorcycle 1 will gradually get up itself to the upright position. In the meantime, the angle formed between the height direction $65m$ associated with the maximum absolute bank angle $\theta m$ and the current height direction 65 increases gradually. Such an angle $\theta r$ defined by the current height direction 65 with respect to the height direction $65m$ associated with the maximum absolute bank angle $\theta m$ will be hereinafter referred to as a "relative bank angle". The relative bank angle is a relative angle defined by the motorcycle 1 with respect to the maximum absolute bank angle θm. That is, the relative bank angle θr is an angle measured between the detected absolute angle (i.e., absolute bank angle θa) and a maximum absolute bank angle (i.e., maximum absolute bank angle θm), the maximum absolute bank angle being a maximum value of the absolute bank angle. According to this embodiment, the driving force is controlled based on this relative bank angle θr.

Now take a look at FIG. 2 again. The acceleration position sensor 43 detects the accelerator position angle that changes as the rider twists the accelerator grip, and outputs it to the basic target position calculation circuit 55. The driving source rotating speed sensor 42 detects the speed of the engine 17 and outputs it to the basic target position calculation circuit 55. In response, the basic target position calculation circuit 55 defines an accelerator-throttle characteristic, representing how the throttle position angle changes with the accelerator position angle, based on the accelerator position angle and the speed of the engine 17. The accelerator-throttle characteristic defined by the basic target position calculation circuit 55 may be a characteristic when the motorcycle 1 is going straight (or standing upright).

FIG. 4 shows how the accelerator-throttle characteristic 71 varies when the motorcycle 1 is going straight forward (standing upright). As shown in FIG. 4, as the accelerator position angle increases, the throttle position angle increases gradually. The basic target position calculation circuit 55 outputs information about such an accelerator-throttle characteristic 71 to a corrected target position calculation circuit 59.

The acceleration sensor 34 detects acceleration on this motorcycle 1 and outputs it to the absolute bank angle detector 51. The gyroscope 33 detects the angular velocity of the motorcycle 1 and outputs it to the absolute bank angle detector 51. The absolute bank angle detector 51 detects the absolute bank angle θa of the motorcycle 1 based on the acceleration and the angular velocity. A known method may be used to obtain the absolute bank angle θa based on the acceleration and/or angular velocity, and detailed description thereof will be omitted herein. Also, as long as the absolute bank angle θa can be obtained, parameters other than the acceleration and angular velocity may also be used to calculate the absolute bank angle θa.

The front wheel speed sensor 35 detects the rotational velocity of the front wheel 8 and outputs it to the corner estimation calculation circuit 53. Meanwhile, the accelerator position sensor 43 outputs the accelerator position angle detected to the corner estimation calculation circuit 53. Based on the accelerator position angle and the variation in front wheel speed, the corner estimation calculation circuit 53 determines whether or not to reset the maximum absolute bank angle θm. The resetting processing will be described in detail later.

The relative bank angle calculation circuit 57 gets information about the absolute bank angle θa from the absolute bank angle detector 51 and also gets information indicating whether or not the maximum absolute bank angle θm should be reset from the corner estimation calculation circuit 53. The relative bank angle calculation circuit 57 determines the value of the maximum absolute bank angle θm by monitoring a variation in absolute bank angle θa. For example, the maximum absolute bank angle θm may be set to be an angle at which the absolute bank angle θa that has been rising starts to fall. The relative bank angle calculation circuit 57 calculates the relative bank angle θr that has already been described with reference to FIG. 3(d) and outputs it to the corrected target position calculation circuit 59.

The corrected target position calculation circuit 59 determines the accelerator-throttle characteristic to be used to control the throttle actuator 41 by reference to information provided by the basic target position calculation circuit 55 about the accelerator-throttle characteristic, information provided by the absolute bank angle detector 51 about the absolute bank angle θa, and information provided by the relative bank angle calculation circuit 57 about the relative bank angle θr, and changes that accelerator-throttle characteristic according to the relative bank angle θr.

FIG. 5 shows how the accelerator-throttle characteristic changes. When the motorcycle 1 is standing upright (i.e., when the absolute bank angle θa is approximately equal to zero degrees), the corrected target position calculation circuit 59 controls the throttle actuator 41 using the accelerator-throttle characteristic 71. When the accelerator-throttle characteristic 71 is adopted, the throttle can be wide open just by turning the accelerator a little. That is to say, in such a situation, the rider needs to move his or her hands or fingers much less, and therefore, can drive the motorcycle 1 straight forward without re-gripping the accelerator or making any other troublesome manipulation.

On the other hand, if the engine power increases steeply in response to the rider's sudden accelerator turning when the absolute bank angle θa is large, then the rear wheel's driving force will increase so steeply as to cause sliding easily. For that reason, when the absolute bank angle θa is large (i.e., when the relative bank angle θr is small), the throttle actuator 41 is controlled by adopting the accelerator-throttle characteristic 75 in which the throttle position angle rises gently with respect to the accelerator position angle. By checking such a sudden increase in engine power with the rider's accelerator turning by adopting the accelerator-throttle characteristic 75, the rear wheel can be prevented from sliding due to such a steep increase in driving force. In addition, since the throttle position angle changes just gently for the magnitude of the accelerator grip turned, the rider can easily twist the accelerator grip as finely as required when rounding a curve.

Also, as the motorcycle 1 gradually rises toward the upright position, the relative bank angle θr also increases gradually. As the rider is raising the motorcycle 1 to the upright position, the magnitude of permissible slip of the rear wheel increases. That is why the accelerator-throttle characteristic is gradually turned into a characteristic when the vehicle goes straight. For example, when the relative bank angle θr is increasing, the throttle actuator 41 is controlled by adopting an intermediate characteristic between the characteristics 71 and 75 (such as the accelerator-throttle characteristic 73). And when the motorcycle 1 has risen to almost the upright position, the throttle actuator 41 will start to be controlled using the accelerator-throttle characteristic 71. In this manner, the rider can accelerate the motorcycle smoothly after having rounded a corner.

In this embodiment, the driving force is controlled based on the relative bank angle θr. When the relative bank angle θr is small, an accelerator-throttle characteristic in which the ratio of the throttle position angle to the accelerator position angle is small is used. And as the relative bank angle θr increases, the accelerator-throttle characteristic is turned into a characteristic in which the throttle position angle changes significantly with respect to the accelerator position angle. By controlling the driving force in this manner, the vehicle can be accelerated to a required degree on a road with a cant as described above and the rear wheel can be prevented from sliding when the vehicle is running on a wet road. Also, even if the absolute bank angle changes every time the vehicle rounds the same curve over and over again when running around a circuit, the driving force can be controlled every time by using the relative bank angle θr. As a result, it is possible to prevent the rider from finding the behavior of the vehicle unnatural or uncomfortable. Furthermore, even if the values of the acceleration sensor 34 and gyroscope 33 deviate significantly from their normal values due to disturbance, for example, those deviations can be canceled by using the relative bank angle θr.

Next, it will be described how the ECU 31 may change the modes of its processing according to the running state of the motorcycle 1. FIG. 6 shows how respective parameters change as the running state of the motorcycle 1 changes. FIG. 7 is a flowchart showing the procedure of the processing to be carried out by the ECU 31.

In FIG. 6, the running state C1 is a state where the motorcycle 1 has started to slow down at a straight end before entering a corner. While the motorcycle 1 is slowing down in this manner, the decision is made whether the maximum absolute bank angle θm may be reset or not.

FIG. 8 shows a condition C11 on which the maximum absolute bank angle θm may be reset. Specifically, the maximum absolute bank angle θm may be reset if variation in front wheel speed (acceleration)≤predetermined value,
absolute bank angle≤predetermined value, and
accelerator position angle≤predetermined value
are all satisfied (in Step S11 shown in FIG. 7).

If the variation in front wheel speed (i.e., acceleration) has turned out to be equal to or smaller than a predetermined value, the decision is made that the vehicle has slowed down. It should be noted that the front wheel speed is used to make this decision because the rear wheel may sometimes be in the air when braked. Also, since the decision just needs to be made whether the vehicle has slowed down or not, an acceleration sensor may be used, too, for example.

Also, if the absolute bank angle has turned out to be equal to or smaller than a predetermined value, the decision is made that the vehicle is standing upright. If the vehicle is slowing down while rounding a curve, when the absolute bank angle becomes greater than a predetermined value, the maximum absolute bank angle θm may not be reset, and the control is carried out using the same maximum absolute bank angle θm with even multiple corners regarded as a single corner.

Furthermore, if the accelerator position angle has turned out to be equal to or smaller than a predetermined value, the decision is made that the vehicle is slowing down. The reason is that if the decision is made, just by sensing a variation in front wheel speed, whether the vehicle is slowing down, a wrong decision could be made due to an abrupt change, for example. By prohibiting resetting if the vehicle is slowing down without closing the accelerator, the resetting decision can be made even more accurately.

It should be noted that the condition C11 on which resetting is allowed is just an example. Thus, the decision can be made more accurately by adding any other condition.

In FIG. 6, the next running state C2 is a state where the vehicle has finished slowing down and has entered a corner. In such a state, the maximum absolute bank angle θm is reset and updated. In this case, resetting and updating are supposed to be made simultaneously. It should be noted that resetting does not mean changing the value into zero but starting to measure the maximum absolute bank angle θm at that corner. Until the maximum absolute bank angle θm is updated, the previous value will be held continuously.

FIG. 9 shows a condition C21 on which the maximum absolute bank angle θm may start to be updated. Specifically, the maximum absolute bank angle θm may start to be updated if at least one of accelerator position angle≥predetermined value, and
engine torque≥predetermined value
is satisfied and if
absolute bank angle≥predetermined value
is satisfied (in Step S12 shown in FIG. 7).

If the absolute bank angle has turned out to be equal to or greater than a predetermined value, the decision is made that the vehicle is rounding a corner at an absolute bank angle θa that is equal to or higher than a certain level. In this case, if the vehicle is almost standing upright, no driving force reduction control is carried out. The reason is that the driving force reduction control should be carried out to lighten the rider's load of turning the accelerator finely while the motorcycle is rounding a curve at a large absolute bank angle θa.

Also, if at least one of the accelerator position angle and the engine torque has turned out to be equal to or greater than a predetermined value, the decision is made that the driving force is being applied to accelerate the motorcycle. The reason is that if the speed (i.e., the engine speed) is high, there is a range in which the engine speed slows down automatically even if the rider turns the accelerator significantly and that the maximum absolute bank angle should be updated on and after a timing when the driving force has reached a level at which the vehicle starts to accelerate. It is also because if the driving force reduction control is started in such a range in which the engine speed slows down automatically, the accelerator position angle should be larger than usual to bring the driving force to the level at which the vehicle starts to accelerate. The driving force reduction control is carried out in order to make the accelerating driving force controllable more easily. That is why as long as the driving force is applied so as to slow down the vehicle, no driving force reduction control is carried out. Optionally, the engine torque may also be detected by sensing an increase or decrease in engine speed as well.

FIG. 10 shows how the accelerator-throttle characteristic changes with the engine torque. As shown in FIG. 10, in a range 77 where the engine torque is negative (i.e., falls within the decelerating range), the throttle actuator 41 is controlled by adopting the accelerator-throttle characteristic 75 that is used when the vehicle is standing upright. And if the engine torque has gone positive (i.e., has entered the accelerating range), the throttle actuator 41 is controlled by adopting the accelerator-throttle characteristic 75.

As shown in FIG. 6, in between the state C2 in which the motorcycle has entered a corner and the state C3 in which the motorcycle has rounded the corner, the maximum absolute bank angle θm continues to be updated. In performing the processing of updating the maximum absolute bank angle θm, if currently stored maximum bank angle<current absolute bank angle
is satisfied, the current absolute bank angle is stored as a new maximum absolute bank angle (in Steps S13 and S14 shown in FIG. 7). And at the timing when this processing of updating the maximum absolute bank angle is performed, the driving force reduction control is started. It should be noted that the driving force reduction control is carried out only in the range where the engine torque is positive (i.e., in the accelerating range) for the reason described above. In performing the driving force reduction control, the relative bank angle θr is calculated (in Step S15). As described above, the accelerator-throttle characteristic is changed according to this relative bank angle θr.

The target throttle position angle may be calculated with respect to the accelerator position angle by the following equation:

$$\text{Target position angle} =$$
$$\text{Basic target position angle} - (\text{Basic target position angle} -$$
$$\text{Bank angle corrected target position angle}) \times$$
$$\frac{\text{Control-ending relative bank angle} - \text{Relative bank angle}}{\text{Control-ending relative bank angle}}$$

The control based on the relative bank angle θr is carried out within the range of the maximum absolute bank angle to the control-ending relative bank angle (in Steps S16, S17 and S18). In this description, the "control-ending relative bank angle" refers herein to an angle at which the control based on the relative bank angle θr is ended, and may be set to be any arbitrary angle. The "bank angle corrected target position angle" refers herein to a position angle associated with the accelerator-throttle characteristic 75 when the vehicle is running at the maximum absolute bank angle θm (i.e., at a relative bank angle θr of zero).

In the interval after the control-ending relative bank angle has been reached and before the vehicle recovers the upright position, the driving force is not controlled but the throttle actuator 41 is controlled in accordance with the accelerator-throttle characteristic 71 to be used in the upright position. That is to say, the throttle actuator 41 is controlled based on the basic target position angle to be used in the upright position (in Steps S19 and S20).

Portions (a) and (b) of FIG. 11 show how the accelerator-throttle characteristic changes with the bank angle. In these drawings, the "current value" is a value falling within the range of the maximum absolute bank angle θm to the control-ending relative bank angle θr1. The throttle actuator 41 is controlled using the accelerator-throttle characteristic 73, of which the values are intermediate ones between those of the accelerator-throttle characteristics 71 and 75. And in the interval after the control-ending relative bank angle θr1 has been reached and before the vehicle recovers the upright position, the throttle actuator 41 is controlled in accordance with the accelerator-throttle characteristic 71 to be used in the upright position.

Next, it will be described how to perform resetting and updating processing when the motorcycle needs to go through a series of curves. FIG. 12 shows how to perform the resetting and updating processing when the vehicle is rounding an S-curve. In the example shown in FIG. 12, the motorcycle 1 is going to round an S-curve which makes the motorcycle 1 turn right first and then turn left. First of all, while the motorcycle is turning right, the maximum absolute bank angle θm is updated, and the driving force is controlled based on the relative bank angle θr associated with the newest maximum absolute bank angle θm. Next, if the three conditions for resetting are all satisfied while the motorcycle 1 is banking to the opposite direction (i.e., to the left), the maximum absolute bank angle θm is reset. And while the motorcycle is turning left, the maximum absolute bank angle θm is updated, and the driving force is controlled based on the relative bank angle θr associated with the newest maximum absolute bank angle θm. In this manner, the driving force can be controlled based on the relative bank angle θr while the motorcycle is turning right and left.

FIG. 13 shows how to perform the resetting and updating processing when the motorcycle needs to go through a double apex corner in which there are a series of two corners with different radii of curvature. In the example shown in FIG. 13, the motorcycle 1 rounds the first curve at a small bank angle and then rounds the second curve at a large bank angle than when rounding the first curve. When the motorcycle is rounding the first curve, the driving force is controlled based on the relative bank angle θr associated with the maximum absolute bank angle θm1. In this case, as the absolute bank angle θa starts to increase again, the maximum absolute bank angle is updated. And when the motorcycle is rounding the second curve, the driving force is controlled based on the relative bank angle θr associated with the maximum absolute bank angle θm2 updated. In this manner, the driving force can be controlled based on the relative bank angle θr while the motorcycle is rounding each of those curves.

In the foregoing description of embodiments, the operation of changing the accelerator-throttle characteristic according to relative bank angle θr has been described as an exemplary driving force reducing control. However, this is only an example of the present invention. Alternatively, a traction control system may carry out the same control based on the relative bank angle θr.

FIG. 14 is a functional block diagram of an ECU 31 which carries out a traction control based on the relative bank angle θr. According to the traction control, the magnitude of slipping of the rear wheel is calculated, and a reference slip value to be a threshold value at which the driving force reduction control is started is also calculated, thereby determining, based on these values, how much the driving force should be reduced.

The ECU 31 shown in FIG. 14 includes an absolute bank angle detector 51, a basic target position calculation circuit 55, a relative bank angle calculation circuit 57, a slip value calculation circuit 91, a reference slip value calculation circuit 93, and a degree of reduction calculation circuit 95. The absolute bank angle detector 51, basic target position calculation circuit 55, and relative bank angle calculation circuit 57 operate just as described above.

The front wheel speed sensor 35 detects the rotational velocity of the front wheel 8 and outputs it to the slip value calculation circuit 91 and the reference slip value calculation circuit 93. The rear wheel speed sensor 36 detects the rotational velocity of the rear wheel 23 and outputs it to the slip value calculation circuit 91. The relative bank angle calculation circuit 57 calculates a relative bank angle θr and outputs it to the slip value calculation circuit 91 and reference slip value calculation circuit 93. The accelerator position sensor 43 detects an accelerator position angle and outputs it to the reference target position calculation circuit 55 and reference slip value calculation circuit 93.

The slip value calculation circuit 91 calculates the current slip value of the rear wheel 23 based on the difference in velocity between the front and rear wheels and the relative bank angle θr. Alternatively, the slip value calculation circuit 91 may also calculate the current slip value of the rear wheel 23 based on the difference in velocity between the front and rear wheels and the absolute bank angle θa.

The reference slip value calculation circuit 93 calculates a slip value to be a threshold value at which the traction control is turned ON and OFF based on the rotational velocity of the front wheel 8, the relative bank angle θr and the accelerator position angle. For example, if the relative bank angle θr is small (i.e., if the vehicle is banked significantly), the magnitude of permissible slipping is small, and therefore, the threshold slip value is set to be low enough to let the traction control interfere easily. On the other hand, if the relative bank angle θr is large (if the vehicle is banked just slightly), the magnitude of permissible slipping is large, and therefore, the threshold slip value is set to be too high to let the traction control interfere easily.

The degree of reduction calculation circuit 95 compares the current slip value of the rear wheel 23 and the slip value to be the threshold value to each other, and gets the traction control started if the current slip value of the rear wheel 23 turns out to be equal to or greater than the threshold slip value. In this case, if the current slip value of the rear wheel 23 is far greater than the threshold slip value, the degree of reduction is increased to stabilize the vehicle's behavior. On the other hand, if the current slip value of the rear wheel 23 is less than the threshold slip value, then no traction control is performed.

When the traction control is performed, the degree of reduction calculation circuit 95 controls the degree of reduction of the driving force by adjusting the ignition time lag of the spark plug 39, for example. Also, the degree of reduction calculation circuit 95 controls the degree of reduction of the driving force by adjusting the injection rate of the fuel injection system 40, for example. Alternatively, the degree of reduction of the driving force may also be controlled by adjusting the throttle position angle of the throttle actuator 41.

In this example, the traction control is carried out based on the relative bank angle θr. By calculating the magnitude of slipping of the rear wheel 23 and the threshold slip value based on the relative bank angle θr, the vehicle can be accelerated to a required degree on a road with a cant as described above and the rear wheel can be prevented from sliding when the vehicle is running on a wet road. Also, even if the absolute bank angle changes every time the vehicle rounds the same curve over and over again when running around a circuit, the driving force can be controlled every time by using the relative bank angle θr. As a result, it is possible to prevent the rider from finding the behavior of the vehicle unnatural or uncomfortable. Furthermore, even if the values of the acceleration sensor 34 and gyroscope 33 deviate significantly from their normal values due to disturbance, for example, those deviations can be canceled by using the relative bank angle θr. Consequently, the vehicle's running performance can be improved by controlling the driving force more precisely and accurately while the vehicle is rounding a curve.

It should be noted that the control operation that has been described in the foregoing description of embodiments may be implemented by hardware circuits, software program, or a combination thereof. A computer program which is defined to get that operation done may be stored in a memory provided for the ECU 31, for example, and the operation is carried out by the ECU 31 (that is a computer). Also, such a computer program may be installed from a storage medium (like a semiconductor memory or an optical disc) on which the program is stored into the motorcycle 1 or downloaded through the Internet or any other telecommunications lines. Alternatively, such a computer program may be installed into the motorcycle 1 via wireless communication.

The present invention can be used particularly effectively for a vehicle which banks while rounding a curve.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2014-179161 filed on Sep. 3, 2014, the entire contents of which are hereby incorporated by reference.

What is claimed is:

1. A driving force control system comprising:
an absolute bank angle detector which detects an absolute bank angle that is an absolute value of a vehicle's bank angle, the absolute bank angle having a maximum value at which the absolute bank angle that has been rising starts to fall;
a calculation circuit which calculates a relative bank angle that is an angle measured between the detected absolute bank angle and a maximum absolute bank angle, the maximum absolute bank angle being the maximum value of the absolute bank angle; and
a controller which controls a driving force of the vehicle based on the relative bank angle.

2. The driving force control system of claim 1, wherein the controller changes an accelerator-throttle characteristic, representing how a throttle position angle of a throttle of the vehicle changes with an accelerator position angle of an accelerator of the vehicle, according to the relative bank angle.

3. The driving force control system of claim 2, wherein the controller is responsive to the relative bank angle being small, so that the controller controls the driving force based on the accelerator-throttle characteristic such that a ratio, between a change of the throttle position angle with respect to a change in the accelerator position angle, is smaller than when the relative bank angle is large.

4. The driving force control system of claim 2, wherein as the relative bank angle increases, the controller modifies the accelerator-throttle characteristic so that a ratio, between a change of the throttle position angle with respect to a change in the accelerator position angle, becomes larger.

5. The driving force control system of claim 2, wherein the controller is responsive to the relative bank angle being small, so that the controller controls the driving force based on the accelerator-throttle characteristic such that a ratio, between the throttle position angle with respect to the accelerator position angle, is smaller than when the relative bank angle is large.

6. The driving force control system of claim 2, wherein as the relative bank angle increases, the controller modifies the accelerator-throttle characteristic so that a ratio, between the throttle position angle with respect to the accelerator position angle, becomes larger.

7. The driving force control system of claim 1, wherein the calculation circuit starts detecting for the maximum absolute bank angle after the vehicle's front wheel speed has decreased.

8. The driving force control system of claim 1, wherein the calculation circuit starts detecting for the maximum absolute bank angle in response to an accelerator position angle of an accelerator of the vehicle being equal to or smaller than a predetermined value.

9. The driving force control system of claim 1, wherein the calculation circuit starts detecting for the maximum absolute bank angle in response to the absolute bank angle being equal to or smaller than a predetermined value.

10. The driving force control system of claim 2, wherein the controller is responsive so that upon determining that the detected absolute bank angle has become equal to or greater than a predetermined value, the controller starts controlling the driving force by changing the accelerator-throttle characteristic.

11. The driving force control system of claim 2, wherein the controller is responsive so that upon sensing that the accelerator position angle has become equal to or greater than a predetermined value, the controller starts controlling the driving force by changing the accelerator-throttle characteristic.

12. The driving force control system of claim 2, wherein the controller is responsive so that upon sensing that a torque of the vehicle's driving source has become equal to or greater than a predetermined value, the controller starts controlling the driving force to change the accelerator-throttle characteristic.

13. The driving force control system of claim 1, further comprising a traction control for further controlling the driving force, wherein the controller changes a threshold slip value, at which the traction control is turned ON and OFF, according to the relative bank angle.

14. The driving force control system of claim 13, wherein the controller is responsive to the relative bank angle being small, so that the controller decreases the threshold slip value, compared to when the relative bank angle is large.

15. The driving force control system of claim 1, wherein the controller reduces the driving force further through a traction control to a varying degree according to the relative bank angle.

16. The driving force control system of claim 15, wherein the controller is responsive to the relative bank angle being small, so that the controller reduces the driving force more significantly than when the relative bank angle is large.

17. A saddled vehicle comprising the driving force control system of claim 1.

18. The driving force control system of claim 1, wherein the calculation circuit starts detecting the maximum value of the absolute bank angle after the vehicle's front wheel speed has decreased to be equal to or less than a predetermined value.

19. A non-transitory computer readable medium storing a computer program which is defined to make a computer control a saddled vehicle's driving force, the program being defined to make the computer perform the steps of:
  detecting an absolute bank angle that is an absolute value of the saddled vehicle's bank angle, the absolute bank angle having a maximum value at which the absolute bank angle that has been rising starts to fall;
  calculating a relative bank angle that is an angle measured between the detected absolute bank angle and a maximum absolute bank angle, the maximum absolute bank angle being the maximum value of the absolute bank angle; and
  controlling the driving force based on the relative bank angle.

20. A driving force control system comprising:
  an absolute bank angle detector programmed to detects an absolute bank angle that is an absolute value of a vehicle's bank angle, the absolute bank angle having a maximum value at which the absolute bank angle that has been rising starts to fall;
  a calculation circuit programmed to calculate a relative bank angle that is an angle measured between the detected absolute bank angle and a maximum absolute bank angle, the maximum absolute bank angle being the maximum value of the absolute bank angle; and
  a controller programmed to control a driving force of the vehicle based on the relative bank angle.

* * * * *